United States Patent [19]

Williams

[11] Patent Number: 4,816,990
[45] Date of Patent: Mar. 28, 1989

[54] METHOD AND APPARATUS FOR FAULT-TOLERANT COMPUTER SYSTEM HAVING EXPANDABLE PROCESSOR SECTION

[75] Inventor: Jeffrey L. Williams, Hopkinton, Mass.

[73] Assignee: Stratus Computer, Inc., Marlboro, Mass.

[21] Appl. No.: 927,746

[22] Filed: Nov. 5, 1986

[51] Int. Cl.⁴ .................. G06F 13/00; G06F 13/20; G06F 13/22; G06F 13/38

[52] U.S. Cl. .................................................. 364/200

[58] Field of Search ... 364/200 MS File, 900 MS File, 364/300

[56] References Cited

U.S. PATENT DOCUMENTS

| | | | |
|---|---|---|---|
| 3,469,239 | 9/1969 | Richmond et al. | 364/200 |
| 3,544,973 | 12/1970 | Borck, Jr. et al. | 364/200 |
| 3,548,382 | 12/1970 | Lichty et al. | |
| 3,641,505 | 2/1972 | Artz et al. | |
| 3,768,074 | 10/1973 | Sharp et al. | |
| 4,015,243 | 3/1977 | Kurpanek et al. | 364/200 |
| 4,015,246 | 3/1977 | Hopkins, Jr. et al. | |
| 4,032,893 | 6/1977 | Maran | |
| 4,075,693 | 2/1978 | Fox et al. | |
| 4,096,572 | 6/1978 | Namimoto | 364/200 |
| 4,112,488 | 9/1978 | Smith, III | |
| 4,228,496 | 10/1980 | Katzman et al. | |
| 4,257,095 | 3/1981 | Nadir | 364/200 |
| 4,263,649 | 4/1981 | Lapp, Jr. | 364/200 |
| 4,323,966 | 4/1982 | Whiteside et al. | |
| 4,356,546 | 10/1982 | Whiteside et al. | |
| 4,356,550 | 10/1982 | Katzman et al. | 364/200 |
| 4,366,535 | 12/1982 | Cedolin et al. | 364/200 |
| 4,410,983 | 10/1983 | Cope | |
| 4,428,044 | 1/1984 | Liron | |
| 4,453,215 | 6/1984 | Reid | 364/200 |
| 4,467,436 | 8/1984 | Chance et al. | 364/513 |
| 4,484,273 | 11/1984 | Stiffler et al. | 364/200 |
| 4,486,826 | 12/1984 | Wolff et al. | |
| 4,608,631 | 8/1986 | Stiffler et al. | 364/200 |
| 4,628,447 | 12/1986 | Cartret et al. | 364/200 |
| 4,630,193 | 12/1986 | Kris | 364/200 |
| 4,638,432 | 1/1987 | Niblock et al. | 364/200 |
| 4,658,353 | 4/1987 | Whittaker et al. | 364/200 |
| 4,674,037 | 6/1987 | Funabashi et al. | 364/200 |

FOREIGN PATENT DOCUMENTS 1200155 7/1970 Austria .
2060229 4/1981 United Kingdom .

OTHER PUBLICATIONS

Manuel, Tom, "Special Report, Computers People Can Count On," *Electronics*, Jan. 27, 1983.

Mano, Morris M., "Computer System Architecture", Second Edition, Section 11.7, pp. 454-473.

*Primary Examiner*—Raulfe B. Zache
*Assistant Examiner*—Robert B. Harrell
*Attorney, Agent, or Firm*—Lahive & Cockfield

[57] ABSTRACT

A computer system of the type having a processor section, a memory section, an input-output section, a system clock, and a system bus for communicating signals between the sections, accommodates a variable number of processor units in the processor section. The processor section hence is expandable. Synchronization is distributed in that each processor unit can synchronize all the units in the processor section. The processor units arbitrate for access to the system bus, and respond to interrupts, on a distributed basis. A distribution counter in each processor unit provides a periodically sequencing unique count to distribute tasks among the processor units.

17 Claims, 5 Drawing Sheets

METHOD AND APPARATUS FOR FAULT-TOLERANT COMPUTER SYSTEM HAVING EXPANDABLE PROCESSOR SECTION

BACKGROUND

This invention relates to a digital computer system that has an expandable processor section. More particularly, the invention provides a computer system that has a system bus interconnecting a processor section, a memory section and an input-output section, and in which the processor section can have a variable compliment of highly autonomous processor units. A computer system according to the invention can thus have, by way of example, one processor unit, two processor units, five processor units or eight or more processor units—to provide progressively greater or lesser processing capacity—without any change by the operator of either software or hardware, other than connecting the desired number of processor units to the system.

The invention further provides a processor unit for substantially autonomous operation in a computer system of the above character with substantially any number of other like processor units.

The invention is particularly applicable to a computer system in which the processor section is highly or even entirely distributed, in that it consists of one or more processor units and has little or no centralized control or supervisory logic or software imposed over the processor units. One example of such a computer system is a fault tolerant computer system that has a selected redundancy of operational elements organized in a manner to provide substantially continuous operation even in the event of one or more faults or failures.

Stratus Computer, Inc., the assignee of this application, is one manufacturer of such computer systems and has marketed such products under the designations FT200, XA400, and XA600. U.S. Pat. No. 4,453,215 assigned to that company describes one fault tolerant computer system of the foregoing type with which the present invention is advantageously practice.

The expansion, and conversely contraction, of a computer processor section by the addition or removal of processor units, to meet changing demands for processing capacity, can be effected relatively easily in a computer system that has a centralized command element that assigns tasks among the processor units. However, such centralized organization often is undesirable. Instead, a decentralized organization is preferred, with autonomous processor units.

Accordingly, it is an object of this invention to provide an improved method and apparatus for the expansion of a computer processor section.

A further object is to provide an improved method and apparatus for changing the number of substantially autonomous processor units that constitute a computer system processor section.

A more particular object is to provide a digital computer system having a processor section with substantially autonomous processor units and which is readily expandable. A further object is to provide a computer system of the above character in which the number of processor units can be changed with minimal operator action and with minimal change in system operating programs and procedures.

Yet another object of the invention is to provide a central processor unit for connection with one or more other similar processor units in a computer system processor section and which includes substantially autonomous means for effecting the distribution of processor tasks, substantially equally or selectively otherwise, among whatever other processor units are in the processor section of the data processing system.

Other objects of the invention will in part be obvious and in part appear hereinafter.

SUMMARY

One feature of a digital computer system according to the invention is that the number of central processor units which constitute the processor section of the system can be changed readily. The change is effected by simply plugging an additional unit, or conversely by unplugging a it from the system. The change in the number of central processor units does not require further operator action, and does not require modification to the system software or other operating controls.

A computer processor unit according to the invention has task distribution logic that enables the unit to perform system processor tasks at certain times, when other like processor units of the system are not conditioned to perform such tasks. The task distribution logic in each processor unit operates with selected synchronism relative to the same logic in other processor units such that different processors units are enabled one at a time, and hence at different times, to perform system processor tasks.

Each processor unit, in further accord with the invention, changes the duration of time during which it is enabled to perform processor tasks in inverse relation to the number of such units in the computer system. For example, in a system having two processor units in the processor section, the two processor units alternate in performing system processor tasks, so that each processor unit typically is enabled to perform such tasks during half the operating time. When the system is expanded to three processor units, the units are again enabled to perform system processor tasks one at a time. Each processor unit provides this task distribution operation autonomously. The computer system hence requires no central master or like control for scheduling the operations of the variable compliment of processor units that constitute the processor section.

Yet another feature of a processor unit according to the invention is that the synchronization of the several processor units in a system is performed on a distributed basis, in that each processor unit can provide the synchronization operation. Thus, in one practice, when an additional processor unit is connected to a computer system, it remains off-line, and hence does not transmit operational signals, which typically may exclude maintenance, initializing, or diagnostic signals, until it attains synchronization with the other processor units of the system. This synchronization can be provided by any one of the processor units, at a time when no other processor unit is transmitting signals in the system.

According to a preferred practice of the invention, each central processor unit of a computer system has a distribution timer, in the form of a distribution counter which is initialized and which steps or otherwise increments in synchronism with all other distribution counters in other central processor units of the system. However, each distribution counter is initialized to a count condition different from that of all others. Each distribution counter thus produces a count, which differs, at any system time interval, from that of all other processor units.

A further feature of the invention is that the distribution counter in each processor unit receives a signal, suitably at least each time it is initialized, which identifies the number of other processor units in the system. The distribution counter responds to this size signal to select the stepping sequence such that the counter cycles with a number of counts determined by the value of the size signal. That is, each distribution counter cycles after a number of steps determined according to the number of other processor units in the processor section among which tasks are to be distributed.

Elements in each processor unit which perform selected tasks respond to a selected value of the distribution count to perform a designated task. Since each unit typically has any selected value of the distribution count as often as each other unit, each processor unit performs—or is enabled to perform—that selected task with essentially the same frequency or duty cycle as each other central processing unit in the processor section of the system. In this manner, the processor units remain highly autonomous in operation, and yet processor tasks are distributed substantially equally among them, independent of the number of processor units which are on-line in the processor section at any time.

Note that the set of central processor units which constitutes the system processing section can be organized in subsets. The distribution counters in the units of such a subset are preferably initialized and incremented to count conditions that are the same or which differ in a known manner. For example, in one preferred practice where each central processor unit is in a subset with one other identical unit, to form a partnered or duplexed pair of units, the two units have distribution counters which are initialized to count conditions which differ only in the least significant digit. Further, the initial counts and the increment sequences of the two counters are selected so that the two counters differ in only the least significant digit. Hence the two partnered distribution counters are always at he same count in all digits other than the least significant one. With this further feature, processor tasks can readily be distributed among subsets of processor units.

In the illustrated embodiment described below, the computer system processor section distributes bus arbitration and interrupt response tasks in the foregoing manner.

A further feature of the invention is that it provides an information processing method for the expansion/contraction of the processor section of digital data processor apparatus having, in addition to the processor section, a memory section, an input-output section, and a bus section for the transfer of signals between the processor section and each of the memory section and the input-output section.

The method includes providing and comprising the steps of at least first and second sets of processor units, each set having at least one processor unit, in the processor section.

A further step is to perform, with each processor unit, both information processing tasks and processor tasks. The processor tasks typically can include such tasks as responding to interrupt signals received by way of the bus section, arbitration for access to the bus section, and synchronization of the processor units.

The method also includes performing selected processor tasks with any one set of processor units substantially automonously of other sets of processor units. This performing of processor tasks by any one set of processor units is to the exclusion of performing processor tasks by other sets of processor units and is for a time inversely proportional to the number of the sets of processor units in the processor section.

A further feature of the method of the invention is to commence information processing operation by the sets of processor units with selected synchronism relative to one another. Yet another feature is to schedule the performance of processor tasks by each set of processor units with clock means therein which operate synchronously with the corresponding clock means in other processor units and selectively offset from such other clock means.

A significant advantage of a computer system having the foregoing features according to the invention is that it can employ essentially any number of autonomous central processor units in the processor section, and the number of such processor units can be changed with minimal operator action and with minimal impact on the system configuration and operating software. Yet the distribution of tasks among the processor units can be substantially uniform, as generally desired for efficient system operation. Further advantages and features of the invention will appear hereinafter.

The invention accordingly comprises the several steps and the relation of one or more of such steps with respect to each of the others, and the apparatus embodying features of construction, combinations of elements and arrangements of parts adapted to affect such steps, all as exemplified in the following detailed disclosure, and the scope of the invention is indicated in the claims.

BRIEF DESCRIPTION OF DRAWINGS

For a fuller understanding of the nature and objects of the invention, reference is to be made to the following detailed description and the accompanying drawings, in which.

DESCRIPTION OF ILLUSTRATED EMBODIMENT

Figure 1:
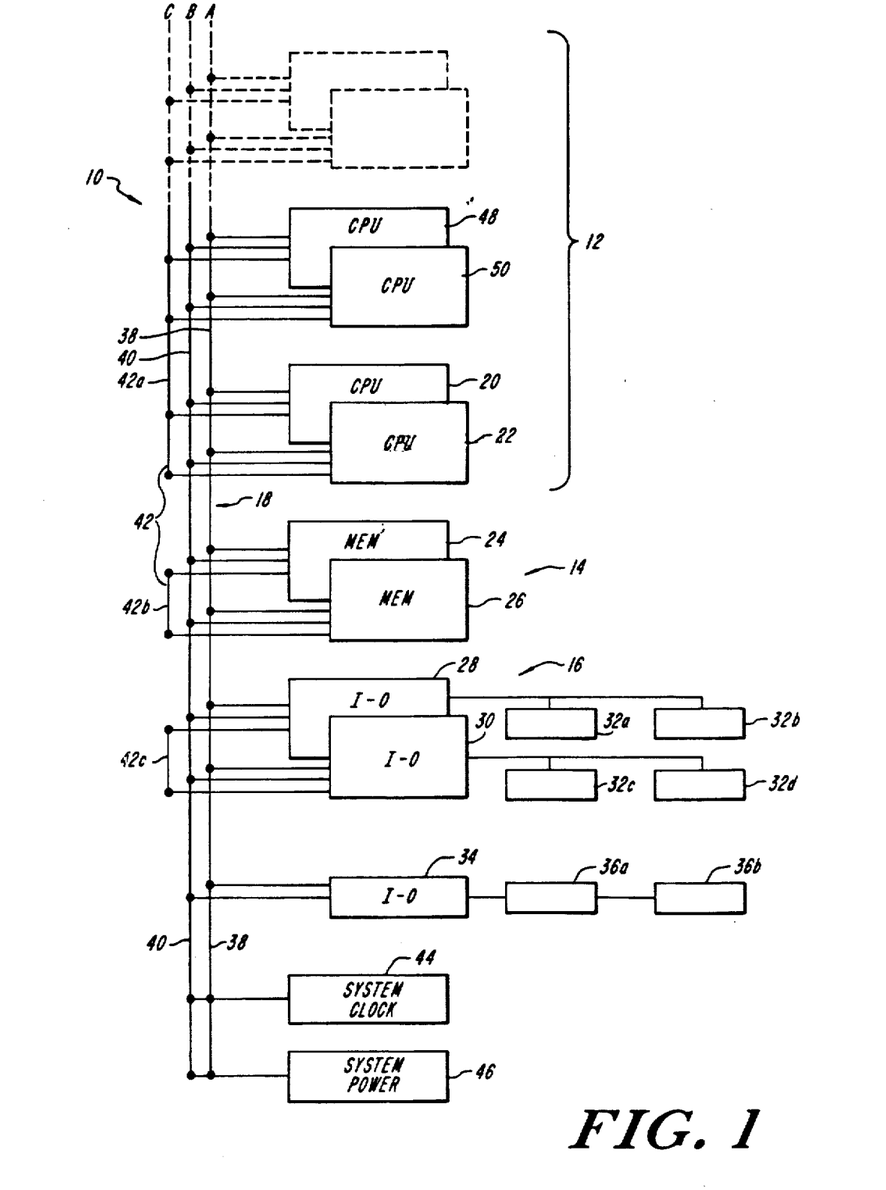
FIG. 1 is a block schematic representation of a computer system embodying features of the invention.

FIG. 1 illustrates the invention embodied in a digital computer system 10 having a processor section 12, a memory section 14, an input-output section 16 and a bus section 18 that provides communication of information, including data and commands, between the processor, memory and input-output sections. The computer system 10 is illustrated as of the fault tolerant type as described U.S. Pat. No. 4,453,215 and accordingly has a selected hardware duplication. In particular, the illustrated system has two identical central processor units 20 and 22 in the processor section 12 and has two identical memory units 24 and 26 in the memory section 14.

The illustrated input-output section 16 has identical I-O control units 28 and 30, each connected with peripheral devices 32a, 32b, 32c, and 32d. A further I-O control unit 34 is illustrated connected with further peripheral devices 36a and 36b. The peripheral devices 32 and 36 can be disk drives, printers, CRT terminals, document readers, keyboards, or communication links or further bus networks, all as is conventional in computer systems.

The input-output section 16 has a pair of duplicated control units 28 and 30, and with a non-duplicated control unit 34, by way of illustrative example. The computer system 10 can have other different organizations and arrangements of input-output control units and peripheral devices, within the scope of the invention. Similarly, the invention can be practiced with a system 10 that does not have the illustrated hardware duplication, or which has different arrangements thereof.

With further reference to FIG. 1, the illustrated bus section 18 includes two identical busses 38 and 40, termed an A bus and a B bus respectively, and has a C bus 42. The A and B busses connect to each control unit, memory unit and processor unit. In general, the signals on the A bus and on the B bus execute information transfers between units of the system 10. Accordingly, these busses carry at least function, address and data signals. In the illustrated embodiment, these busses also carry system timing signals and power.

The C bus 42 has a segment 42a that connects to each processor unit, and has a segment 42b that connects to each memory unit. A further C bus segment 42c connects to each I-O control unit. The several segments of the C bus, which in the illustrated system are separate from one another, each carry signals that pertain only to the units which it interconnects. This includes diagnostic/maintenance signals and initializing signals. The illustrated system 10 further includes a system clock 44 which applies system timing signals to the A bus 38 and to the B bus 40. There is also a system power section 46 which provides operating power to all the units 20, 22, 24, 26, 28, 30 and 34 by way of the two busses 38 and 40. The single common bus section 18 thus interconnects the system units to provide all information transfers and other signal communications between them. The bus section also provides operating power to the units of the system from the main supply 46 and provides system timing signals from the system clock 44.

In accord with the invention, the computer system 10 further has an additional central processor unit 48 in the processor section 12 and connected to the bus section 18 identically as the processor units 20 and 22. The unit 48 is illustrated as paired with a similarly-connected, like central processor unit 50. Additional central processor units, singly or in partnered pairs, can be connected in the system 10 in the same manner, as indicated with the broken line showing in FIG. 1.

One aspect of the operation of the system 10 is that, in the absence of a fault, the partnered central processing units 20 and 22 operate in lock-step synchronism with one another. Thus, both paired units drive the A bus and the B bus identically, and both are driven identically by the two busses. The same is true for the partnered central processing units 48 and 50. It is also true for the partnered memory units 24 and 26.

The peripheral control units 28 and 30, on the other hand, are illustrated as not operating in full synchronism with one another and hence can connect with peripheral devices 32a, 32b, 32c and 32d that operate asynchronously of one another. A disk memory is an example of such a peripheral device. During fault-free operation with disk memory peripheral devices, each control unit 28 and 30 writes data it receives from the busses 38 and 40 on one peripheral disk memory connected with it. Hence two disk memories, one connected to each control unit 28 and 30, contain identical data. During a read operation, the system 10 reads the stored data from one of these two disk memories, depending on which control unit 28 and 30 is available to effect the read operation in the least time, which typically means with the shortest memory access time. One alternative not shown is for the two control units 28 and 30 to connect via a common peripheral bus to a number of peripheral devices capable of synchronous operation, in which case the two control units 28 and 30 can operate in lock-step synchronism. This synchronous operation is suitable, for example, with peripheral devices such as key boards, display terminals, and modems, among others. The peripheral control unit 34, which is illustrated as operating without a partner unit, typically operates asynchronously of the other peripheral control units 28 and 30 and operates the peripheral devices 36A and 36B to which it is connected according to protocol appropriate for those devices.

With further reference to FIG. 1, the units 20 through 30 and 34, 48 and 50 of the system 10 typically check for fault conditions during each information transfer. In the event a fault is detected, the unit in question is disabled from driving either the A bus 38 or the B bus 40. This protects the computer system from the transfer of potentially faulty information between any units. Where the faulted unit has a partner unit, however, that partner unit continues operating. The system can thus detect a fault condition and continue operating without any interruption being apparent to the user. Reference is to be made to the noted U.S. Pat. No. 4,453,215, which is incorporated herein by this reference, for further description of the FIG. 1 system 10 construction and operation.

The system 10 processor section 12 thus has a set of one or more identical processor units, the illustrated system includes four such units 20, 22, 48 and 50. Further they are illustrated as organized in subsets of two, such that in the absence of a fault the units 20 and 22 operate in lock step synchronism with one another and perform identical operations. The other illustrated pair of partnered processor units 48 and 50 operates in the same manner. In the event of a fault, for example in the unit 48, the partner unit 50 continues operating, without interruption.

The processor section 12 has no centralized control or master scheduling element. Rather, it is illustrated as constituted exclusively of the processor units. Further, the central processor units 20, 22, 48 and 50 which constitute the processor section 12 are highly autonomous, in that each processor unit operates substantially independently of the others except for selected non-processing operations, such as start-up routines and diagnostic and maintenance procedures. The computer system 10 hence can operate with only any one central processor unit connected with the bus section, i.e. with all other processor units unplugged and hence removed, and, alternatively, with any plurality of processor units so connected.

Where two or more processor units, or pairs of partnered units, are active in the system 10, the invention provides automatically for only one such subset of one or more units to perform certain tasks at any time, and further provides that the performance of such tasks be distributed equally, or with other selected frequency, among the subsets of units. This attainment of this operation automatically with any number of processor subsets in the system enables the section to be expanded and contracted essentially at will, and significantly enhances the efficiency of the multi-subset processor section. Particular inefficiencies that this task distribution avoids include unnecessary interruption of processor units, unwanted processor operations, and redundancy that can lead to ambiguity.

Tasks that are distributed in this manner are herein termed system processor tasks or processor-section tasks, in that it makes no difference which subset is enabled to perform the task, so long as one subset in the section is enabled. One such processor-section task is gaining access to the bus section for sending information, such as for a data transfer with a memory unit or with a peripheral device by way of an input-output control unit. That is, the illustrated system 10 is organized such that the bus section accommodates a single information transfer operation of any given type at a time, such as a cycle definition operation, an address operation or a data transfer operation. The illustrated system accordingly requires that the processor units arbitrate for access to the bus. The foregoing distribution of this processor-section task enables only one processor subset at a time to have highest priority for bus arbitration, and distributes the arbitration ranking among the variable compliment of processor subsets.

Another example of a processor-section task is handling interrupt requests. Interrupt requests to the processing section arise, for example, when a peripheral device or memory unit has information to send to a processor unit, or when it is ready to receive further information from a processor unit. An interrupt also occurs when a newly connected processor unit is ready to commence on-line processing operations when one or more other processor units are already on-line. The efficiency of the system 10 operation is enhanced when only one processor subset interrupts whatever operation is in process to service such an interrupt.

Another processor-section task which the invention distributes among any one of plural processor subsets is the synchronization of the subsets. The subsets typically are to be synchronized to a computer system master clock whenever a processor unit is turned on. It is desirable that only one processor subset initiate this synchronization.

Generally the selection of one processor subset to perform any of these processor-section tasks involves, in effect, an interaction between the several subsets. The invention attains the desired operation with this interaction being restricted to a selected synchronization of the processor subsets; the subsets otherwise operate autonomously of one another.

The invention attains this pseudo interactive, task-distribution result with processor units that are identical, and hence without requiring that any unit or any separate device provide master control. Instead, each central processor unit in accord with the invention includes task distribution logic that schedules when that unit, in the presence of no other units or in the presence of one or more other units, and whether partnered or not, is enabled to perform a processor-section task. The task distribution logic accounts for the number of other central processor units in the system and in response automatically distributes the tasks equally or with other selected frequency among the processor subsets.

The provision of such task distribution logic in each central processor unit thus enables the system 10 to have a variable number of units in the processor section 12, and without requiring operator interaction other than providing the desired number of processor units connected to the bus section, and without operator modification of any software programs or of other operating controls or routines.

Figure 2:
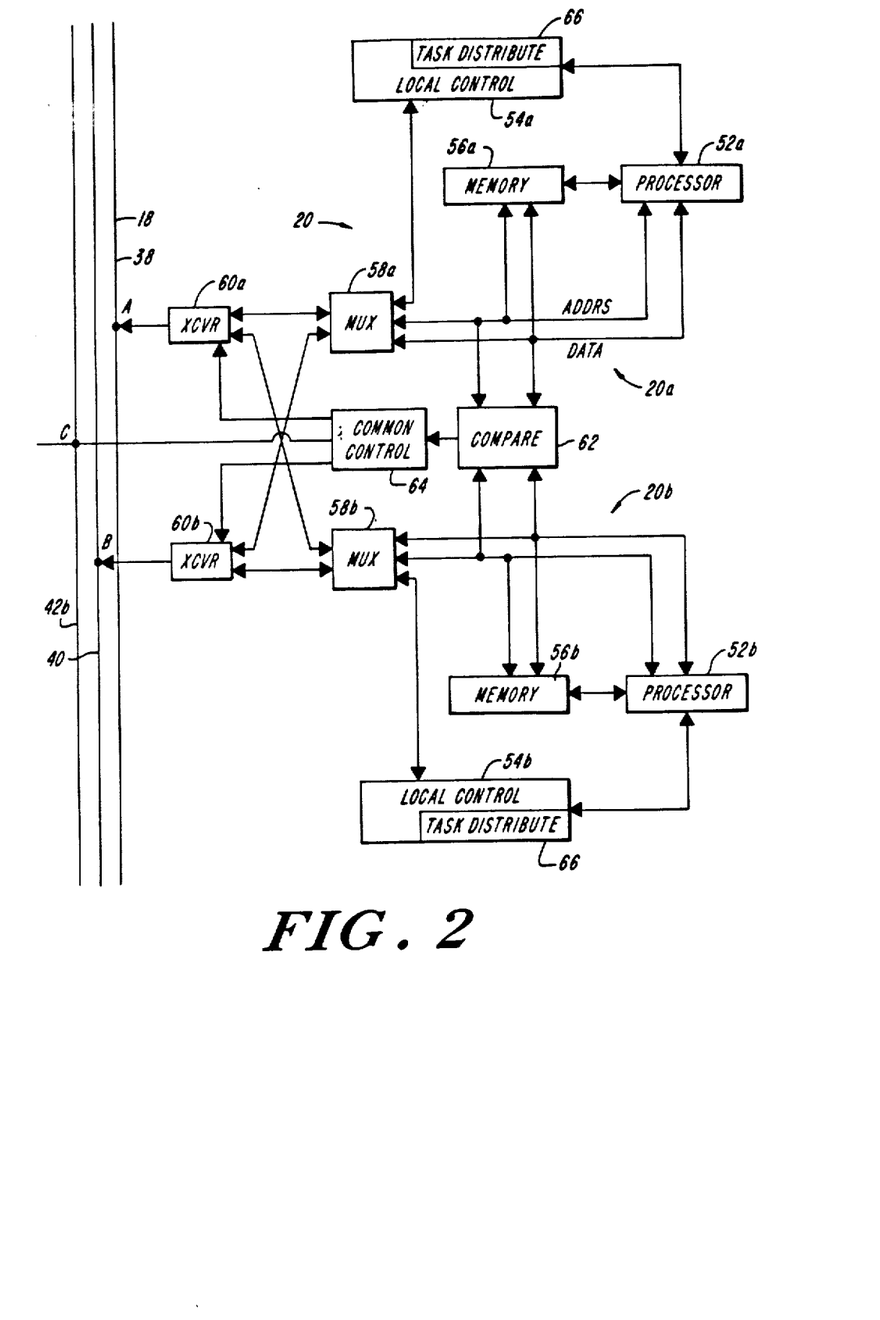
FIG. 2 is a functional block representation of a central processor unit for the system of FIG. 1.

FIG. 2 shows that the illustrated central processor unit 20, which is typical of the other central processor units 22, 48 and 50, has two processor stages 20a and 20b, for purposes of fault detection within the unit 20. The processor stage 20a has a processor element 52a, a local control element 54a, a memory element 56a, and a multiplexor element 58a for communicating signals between the local control, processor, and memory elements and the bus section 18. The other processor stage 20b similarly has a processor element 52b, a local control element 54b, a memory element 56b, and a multiplexor element 58b. The memory, processor, and local control elements of the two processor stages 20a and 20b operate identically and in total lock-step synchronism with one another. A pair of transceivers 60a and 60b are cross connected between multiplexors 58a and 58b and the A bus 38 and the B bus 40 to provide communication to both the A bus and the B bus concurrently, or with either one bus, in response to Bus Obey control signals.

The processor unit 20 further has a compare element 62 which compares signals in the processor stage 20a with corresponding signals in the processor stage 20b, and which produces a Fault signal when corresponding signals in the two stages differ. The processor 20 also has a common control element 64 which is connected with each transceiver 60a and 60b, and with the C bus segment 42a of the bus section 18. In response to the Fault signal, the control element 64, among other operations, typically produces an Error signal which it applies selectively to either the A bus 38 or the B bus 40, or to both busses, for transmission to all units of the system 10. Also in response to a Fault signal, the control element switches the processor unit from the on-line condition, to an off-line condition, this action disables the unit 20 from driving signals onto the A and B busses, and onto the C bus—except typically for response to diagnostic signals.

With further reference to FIG. 2, each local control element 54a and 54b includes task distribute logic 66. The illustrated logic includes a task distribution circuit and a synchronize circuit. The task distribution circuit produces a distribution count that steps in synchronism with a system timing signal and hence in synchronism with the distribution count of each other central processor unit in the computer system. Further, the task distribution circuit of each central processor unit produces a distribution count that is unique, in that it differs from the count produced in every selected other processor unit in the computer system. One preferred arrangement is that the distribution count of each processor unit differ from that of every other processor unit in the system. One alternative is that the count be the same as that of the partner processor unit, i.e that the processor units in each subset produce the same distribution count, and differ from that of every other processor subset in the system. Further, the stepping of the distribution count cycles in accordance with the number of central processor subsets in the system.

Thus, the distribution counts of the several processor subsets in the system can alternate in having a selected value, such that each processor subset has that selected distribution count value once, and then a second time only after every other processor subset has had that same distribution count value. In response to this selected count value, each processor subset has, for example, highest bus arbitration priority among the other processor subsets. Also in response to a selected value of the distribution count, which may be the same as or different from the one assigned high arbitration priority, each processor subset is enabled to respond to an interrupt request.

A selected further value of the distribution count can enable a processor subset to have the second highest arbitration priority. Similarly a selected distribution count can enable one processor subset at a time to be the second one available to process interrupts.

Figure 3:
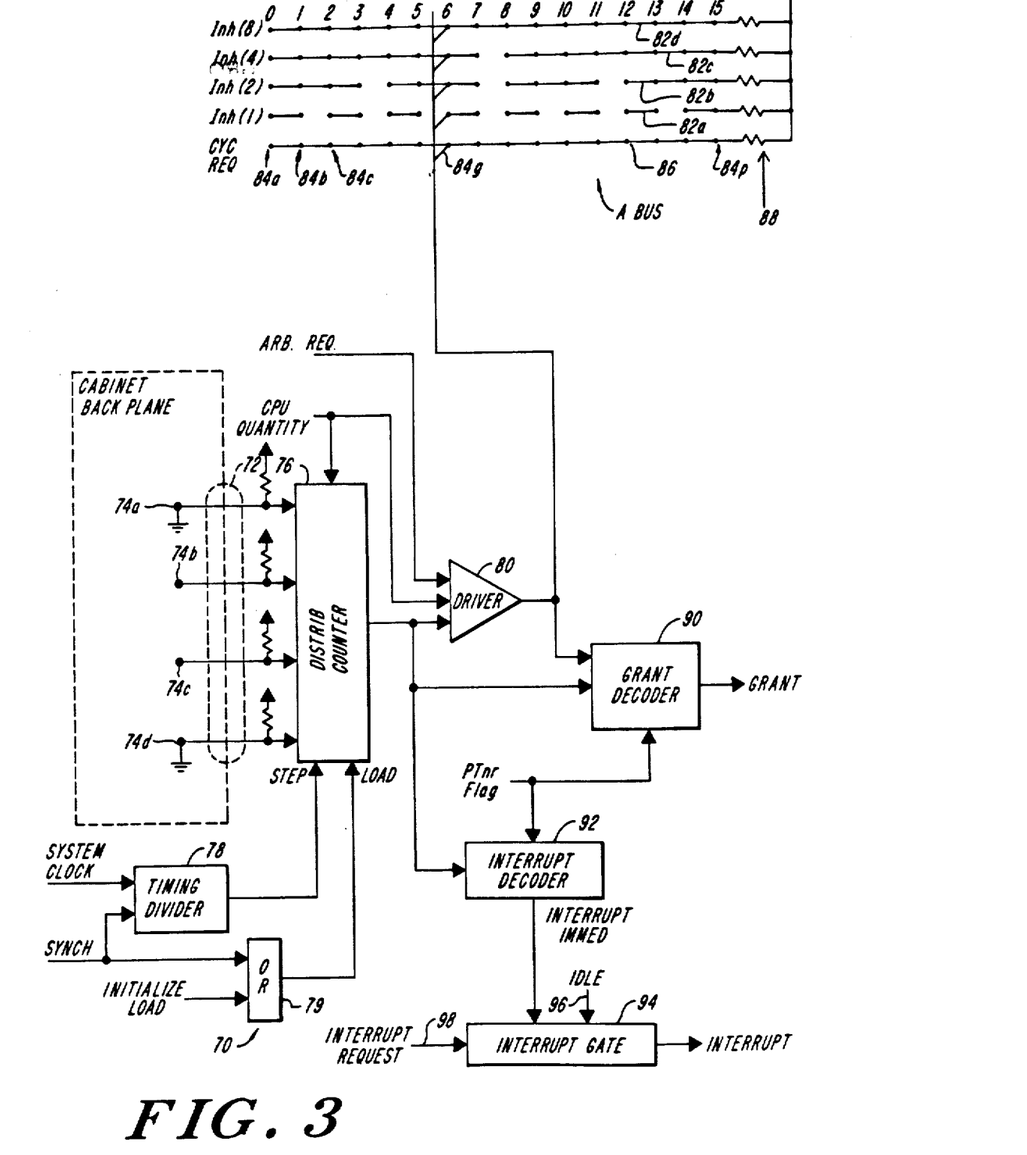
FIG. 3 is a block schematic representation of a task distribution circuit according to the invention for distributing bus arbitration and interrupt tasks.

With reference to FIG. 3, the distribution circuit 70 in a processor local control element 54 connects, suitably by way of a processor unit connector 72, to slot number connections 74a, 74b, 74c and 74d on the system cabinet backplane. Each illustrated electrical lead feeding through the connector 72 to a connection 74 is connected to a positive supply voltage through a pull-up resistor. The slot number connections are set to specify the identification number of the backplane slot into which that processor unit is connected. The illustrated connections 74 are either a connection to ground, or an open circuit. Connections 74a and 74d are of the former type, and the remaining connections 74b and 74c are of the latter type. The ground connection produces a logic ZERO value, whereas the open connection, with the pull-up resistor, provides a logic ONE value. The illustrated set of slot number connections thus provides the slot number, when read starting from the top, of "0110".

The processor connector 72 applies the slot number from the backplane connections 74 to inputs of a distribution counter 76 in the distribution circuit 70. Other inputs to the illustrated distribution counter 76 are a CPU Quantity signal identifying the number of central processor units in the processor section 12, a Step signal which increments the count of the distribution counter 76, and a Load signal. An instruction sequence, e.g. software or firmware, in the processor unit produces the CPU Quantity signal as part of a start-up routine which the processor unit executes when it is first turned on after being plugged into the cabinet backplane. The processor start-up sequence produces this signal for example by interrogating all the processor slots assigned to the section 12.

A timing divider 78 in the distribution circuit 70 produces the Step signal by dividing down the System Clock signal received from the A and B busses 38 and 40.

The Load input signal to the distribution counter 76 is a Synch signal which the processor unit produces in response to a command which it receives from the bus section 18, for loading the distribution counter in synchronism with all other processor units in the system processor section 12, as described below with reference to FIG. 4. The timing divider 78 also receives the Synch signal, as shown.

The multiple-digit count output from the distribution counter 76 is applied to a driver 80 that applies it to inhibit conductors 82 of the A bus 38. The other processor stage 20b in the central processor unit 20 produces, with the distribute logic 66 in the local control element 54b thereof, an identical arbitration request count signal that is applied to the B bus 40.

With further references to FIG. 3, the A bus 38 is illustrated as having a set of four arbitration conductors 82a, 82b, 82c, and 82d which connect to sixteen electrical receptical 84a, 84b, 84c, . . . 84p on the system cabinet backplane. Each receptical 84 is assigned a slot number, the illustrated recepticals being numbered accordingly from "0" to "15." Each receptical 84 is illustrated simply as a vertical column of connections to the four arbitration conductors 82 and to a cycle request conductor 86 of the A bus 38. This network thus has four arbitration conductors and can handle up to $(2)^4$ or sixteen units, each connected to a separate receptical 84. A network with five arbitration conductors, for example, can handle up to thirty-two access requesting units.

The cycle request conductor 86 extends continuously along the A bus 38 to all the recepticals 84, as FIG. 3 shows. The arbitration conductors 82, on the other hand, are segmented according to binary logic such that only one, the conductor 82d which is assigned the binary value $(2)^3$, extends continuously to all sixteen connectors 84. This conductor carries a signal designated Inhibit Eight, i.e. Inh (8). The remaining arbitration conductors 82c, 82b, and 82a are designated as carrying, respectively, an Inhibit Four signal, an Inhibit Two signal and an Inhibit One signal. The arbitration conductor 82c is segmented so that each segment connects to eight successive priority-ordered recepticals 84. Thus this conductor 82c has a first segment which connects together the recepticals assigned to slot numbers 0–7, and has a second segment which connects together the recepticals at slot numbers 8–15. Similarly, the Inh. (2) conductor 82b is segmented to connect together every four successive priority-ordered recepticals, and the conductor 82a is segmented to connect together only every two successively ordered recepticals. In each instance, there is no connection along a given arbitration conductor between different segments thereof, or between different segments of different conductors.

As shown at the right side of FIG. 3, at the end of the A bus 38, a bus terminator 88 connects the Inh (8) arbitration conductor 82d and the Cycle Request conductor 86 to a positive supply voltage through separate pull-up resistors. Further pull-up resistors are similarly connected from each terminal segment of the arbitration conductors 82c, 82b, and 82a to the pull-up supply voltage. These termination and pull-up connections normally maintain each conductor 82 segment and the conductor 86 at a selected positive voltage, i.e. in a pull-up condition. A grounded or other low voltage external signal however can pull the voltage of any given conductor or conductor segment down from this normal positive condition.

With further reference to FIG. 3, other input signals to the driver 80 are the CPU Quantity signal, and an Arbitration Request signal. The CPU Quantity signal specifies which of the arbitration conductors 82 the driver 80 actuates. For example, when the CPU Quantity signal identifies that four processor subsets are connected, the driver 80 actuates only the Inh (1) and Inh (2) conductors, whereas a signal identifying sixteen processor subsets causes the device to actuate all four inhibit conductors 82. The processor unit 20 produces the Arbitration Request signal, in the local control element 54, when for example it has information to transmit to another unit in the system. In response to the Arbitration Request signal, the driver 80 applies ground level signals in accordance with the count from the distribution counter to segments of as many inhibit conductors 82 the CPU Quantity signal specifies.

A grant decoder 90 in the distribution circuit receives as input signals the distribution count output from the counter 76 and compares it with a further set of input signals received from the bus inhibit conductor segments and cycle request conductor to which that processor is connected by way of its connector 84. The grant decoder functions logically as an exclusive OR circuit and accordingly produces an assertive Grant signal circuit on its output line only when the two sets of input signals it receives are in full agreement. This occurs only when the processor stage in which the decoder is connected produces, and applies to the bus arbitration conductors, a distribution count at the same time that no other unit is applying a higher priority distribution count to the bus.

A further input signal illustrated to the grant decoder 90 is termed a Partner Flag. It causes the grant decoder to disregard the least significant digit signal received at the other two inputs when the processor unit has a partner processor unit. This is because partnered processor units are, in the illustrated system, connected into adjacent slot numbers identified such that the least significant digit of the distribution counts from the two partnered processor units differ only in the least significant digit and are otherwise identical.

In the operation of the illustrated distribution circuit 70 in the processor stage 28, shown in FIG. 3, the distribution counter 76 continuously receives a slot number from the backplane connections whenever the processor is plugged into the system 10. When the processor unit 20 receives a Synch signal from the bus section 18, which occurs for example when the unit is first plugged into the system, or whenever another central processor unit is plugged into the system, the distribution counter 76 loads the slot number and the timing divider is synchronized. The Synch signal is applied to all processor units in the system 10, and hence both of the foregoing operations occur in lock-step synchronism with the same operations in the corresponding circuit in all the other processor units. Thus each distribution counter in the system processor section is simultaneously loaded, but each with a different slot number. Further, the several distribution counters in the system processor section thereafter step, in lock-step synchronism, in response to stepping signals each receives from its timing divider 78 in response to system clock signals.

Each distribution counter 76 throughout the system processor section also receives an identical CPU Quantity signal, which identifies the number of processor units in the system processor section. Each distribution counter responds to this signal by cycling after a number of steps corresponding to the number of processor units in the system. In particular, in a processor section 12 having only one subset of two partnered central processor units, e.g. units 20 and 22 in FIG. 1, the CPU Quantity signal identifies that there are two processor units in the processor section. Further, in one specific preferred embodiment, the two units are connected to backplane slots number four and five. The distribution counters in the two processor units are therefore loaded to the initial count numbers four and five, which are binary "0100" and "0101," respectively. With this arrangement, the distribution counter responds to each Step signal by changing only the least significant digit of the count therein.

When a system in this embodiment has four central processor units, such as the compliment of processor units 20, 22, 48 and 50 shown in FIG. 1, they are connected into slots designated with the hexodecimal numbers eight, nine, A, and B. In response to the CPU Quantity signal designating a quantity of four units in the system, the distribution counter 76 operates with a count sequence in which it sequentially changes the least significant bit, changes bit One again, changes the least significant bit, and then bit One, etc.

The hexadecimal distribution counts which the four processor units thus produce in successive time intervals are as shown in the following Table I:

TABLE I

|  | Slot # | Time Interval | | | | |
|---|---|---|---|---|---|---|
|  |  | 0 | 1 | 2 | 3 | 4 ... |
| Processor Unit 20 | 8 | 8 | 9 | B | A | 8 ... |
| Processor Unit 22 | 9 | 9 | 8 | A | B | 9 ... |
| Processor Unit 48 | A | A | B | 9 | 8 | A ... |
| Processor Unit 50 | B | B | A | 8 | 9 | B ... |

As a further example, when this system has eight central processor units, they are connected into slots number 0, 1, 2, 3, 4, 5, 6, and 7. In response to the corresponding CPU Quantity signal, the distribution counters 76 in the several processor units operate with a count sequence which successively changes the least significant bit, bit One, the least significant bit, bit Two, etc.

The following Table II shows the resultant hexadecimal distribution count of each processor unit for successive time intervals.

TABLE II

|  | Time Interval | | | | | | | | |
|---|---|---|---|---|---|---|---|---|---|
|  | 0 | 1 | 2 | 3 | 4 | 5 | 6 | 7 | 8 ... |
| Processor Unit Slot 0 | 0 | 1 | 3 | 2 | 6 | 7 | 5 | 4 | 0 ... |
| Processor Unit Slot 1 | 1 | 0 | 2 | 3 | 7 | 6 | 4 | 5 | 1 |
| Processor Unit Slot 2 | 2 | 3 | 1 | 0 | 4 | 5 | 7 | 6 | 2 |
| Processor Unit Slot 3 | 3 | 2 | 0 | 1 | 5 | 4 | 6 | 7 | 2 |
| Processor Unit Slot 4 | 4 | 5 | 7 | 6 | 2 | 3 | 1 | 0 | 4 |
| Processor Unit Slot 5 | 5 | 4 | 6 | 7 | 3 | 2 | 0 | 1 | 5 |
| Processor Unit Slot 6 | 6 | 7 | 5 | 4 | 0 | 1 | 3 | 2 | 6 |
| Processor Unit Slot 7 | 7 | 6 | 4 | 5 | 1 | 0 | 2 | 3 | 7 |

With such a distribution count sequence, each processor unit in the processor section has, at any time, a distribution count different from all other processors. Accordingly, each processor unit has highest arbitration priority one at a time on an equal time distribution basis relative to the other processor units in the system. Further, when the units in slots 0 and 1 are partnered to constitute one subset, the units in slots 2 and 3 constitute another subset, and the units in slots 4 and 5 and in slots 6 and 7, respectively, constitute two further sub-sets, the distribution counts in each subset differ only in the least significant digit. Moreover, when the least significant digit is disregarded, each subset of units has a distribution count different from all other subsets and has highest arbitration value one at a time and on an equal time distribution basis.

Note that each processor attains this operation without monitoring the operation of other processor units and without any overriding supervisory system control or master processor. The system-wide inputs to the compliment of processor units are simply a different slot number applied to each processor unit, system clock signals, and a common start-up Synchronize signal.

With continued reference to FIG. 3, each illustrated processor unit in the processor section 12 responds to external interrupts only in response to a selected distribution count value. Thus, at any time, only one processor subset in the processor section is responsive to external interrupts. The other processor subsets can, in essence, ignore them and instead devote full operating time to processing questions.

The invention attains this further task-distributing operation, as also shown in FIG. 3, by applying the distribution count output from the distribution counter 76 to an interrupt decoder 92, the output of which is applied to an interrupt gate 94. Other inputs into the interrupt gate are a Processor Idle signal on line 96, and an Interrupt Request signal on line 98. The interrupt gate produces an Interrupt signal, which enables the processor to respond to the Interrupt Request, in either of two conditions. One is when the processor is idle, as designated by the Idle Signal on line 96.

The other condition is when the distribution count applied to the decoder 92 has the value which the decoder is set to recognize as an Interrupt Immediately value. Typically all interrupt decoders in the several processor units of a system processor section are set to decode the identical distribution count value as an Interrupt Immediately condition. Since the distribution counters in the different processors attain a given count value only one at a time, only one processor unit in a processor section produces an Interrupt Immediately signal at any time. Further, the Partner Flag signal is also applied to the interrupt decoder 92. In this way, each subset of processor units employs the distribution count to schedule when that subset responds to external interrupts, and conversely when it continues operating and another subset of processor units is to respond to a given interrupt.

Figure 4:
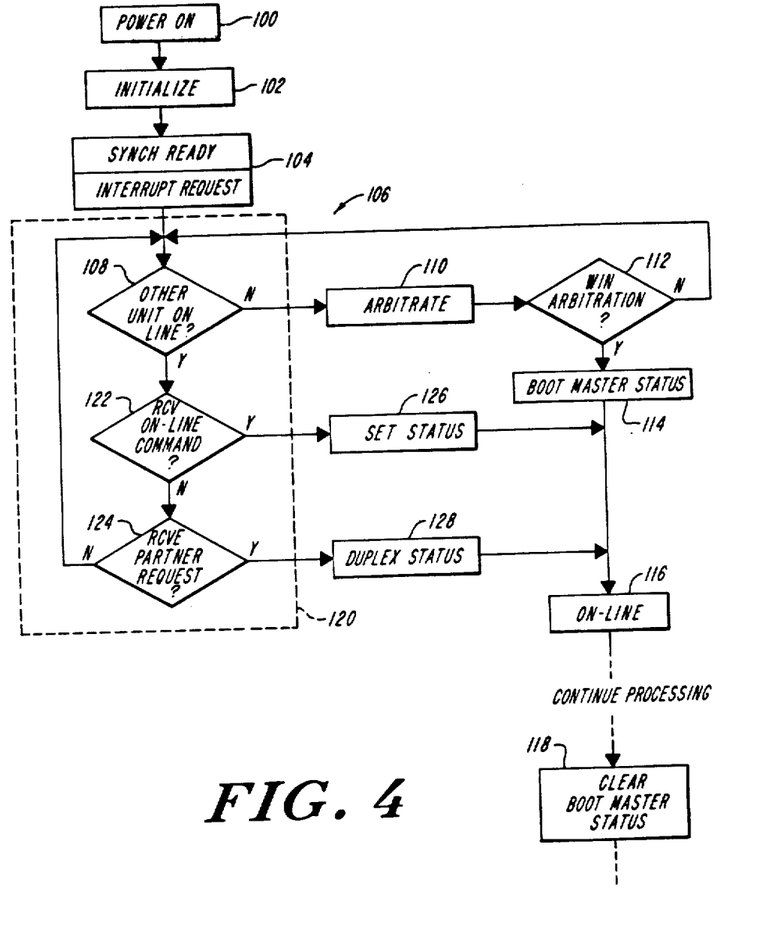
FIG. 4 is a flow chart of distributed synchronize operation in accordance with the invention.

In addition to the distribution circuit described with reference to FIG. 3, the task distribution logic 66 (FIG. 2) of the processor unit 20 has a synchronize circuit 134 shown in FIG. 5 which operates as shown in FIG. 4. The function of this synchronize circuit is to provide an orderly progression of each processor from the off-line state to the on-line state. When a processor is in the off-line condition, it can execute an initialize routine and can respond to status and maintenance inquiries by way of the bus section 18. However, it does not initiate operational signals such as interrupt requests, address signals, or data. When in an on-line condition, a processor unit can initiate such signals and apply them to the A bus 38 and/or the B bus 40.

The illustrated computer system can utilize the sequencing which the synchronize circuit 134 provides in several instances. Once is to attain an orderly start-up when power is applied to a system which has multiple processor units. Another instance is to enable a functioning processor unit to bring a newly activated partner processor unit into operation in lock step synchronization with it, i.e. for one processor unit to bring another processor unit into duplex operation with it. A further instance is to introduce a new processor unit, or a new duplex partnered pair of processor units, to a functioning system. The synchronize circuit in each processor unit attains this function in a manner that requires no centralized master device.

The synchronize circuit of each processor device provides the foregoing operation with a sequence of operations as illustrated in the flow chart FIG. 4, which commences when the processor unit is first turned on or otherwise first receives operating power, action box 100. The processor unit executes an initialize routine, action box 102, as conventionally appropriate for that unit. One initialize operation is to load the distribution counter 76 (FIG. 3) with the slot number corresponding to where the unit is plugged into the system back plane. An Initialize Load signal applied to the OR gate 79 performs this operation, and the counter remains at that count, i.e., does not step, until the unit is switched to the on-line state. The unit is in the off-line condition during execution of the initialize routine.

When the processor unit completes the initialize routine 102, it produces a Synchronize Ready signal which is applied to the synchronize circuit 134, and it generates an Interrupt Request, both as indicated in action box 104. The Interrupt Request signal is applied to one or both of the A and B busses, and illustratively (FIG. 5) to the B bus 40 to alert any processor units which may already be on-line of the request for service by the processor unit in question.

The processor unit next commences an initialize routine 106 which provides three alternative sequences by which the unit can proceed to the on-line condition.

One sequence by which an off-line processor unit attains on-line status occurs when no other processor unit is in the on-line condition. The processor unit first determines whether another processor unit is on-line, decision box 108. In response to a negative result, the unit proceeds to arbitrate for a bus cycle, as designated with action box 110. If the unit fails to prevail in the arbitration, as designated with a negative result from decision box 112, the operation cycles back to enter decision box 108, as indicated. Presumably, another processor unit in a higher priority slot coincidentally arbitrated for a bus cycle and prevailed, and proceeds as described below.

On the other hand, upon prevailing in arbitration so that the result of action box 112 is affirmative, the processor unit becomes the first one to attain on-line condition. It attains this result by setting a Boot Master status flag, as indicated with action box 114, and proceeds to on-line condition with action box 116, after which it commences program execution.

A processor unit which has attained on-line condition by proceeding through action box 110, decision box 112 and action box 116 can, in the course of program execution, service interrupt requests which other off-line processor units produces upon executing action box 104. In this way, and by means of further sequences of the synchronize routine 106 described below, a processor unit which has Boot Master status brings other units on-line. Upon completion of this operation, the first unit that went on-line clears the Boot Master status, as shown in FIG. 4 with action box 118. Thereafter, no processor unit in the section 12 (FIG. 1) has Boot Master status. Instead, all the processor units have equal status; and only the count values in the distribution counters differ.

With continued reference to FIG. 4, a further sequence by which an off-line processor unit attains on-line condition in the synchronization routine 106 occurs when the unit receives an On-Line Command. In particular, the off-line processor unit typically is in an off-line wait condition, as designated in FIG. 4 at 120. Accordingly, as indicated, the operation of the unit sequences through an affirmative result from decision box 108 because another unit is on-line, fails to receive an On-Line Command and hence attains a negative result from decision box 122, and fails to receive a partner Request signal and accordingly produces a negative result from decision box 124. The receipt of an On-Line Command, however, produces an affirmative result from decision box 122. The unit then sets a status flag appropriate for the received command, i.e. either simplex or duplex, as designated with action box 126. The operation of the processor proceeds to action box 116, where it switches to the on-line condition and proceeds with program execution. By this procedure, an additional processor unit—which is to function either in simplex manner or in duplex manner partnered with another processor unit—can be brought on-line in the processor section of a computer system.

The third illustrated sequence by which an off-line processor unit becomes on-line is for a unit which is to be partnered with another unit that is already on-line. To facilitate describing this operation, assume that an on-line processor unit X is processing interrupt requests, that a processor unit A is on-line, and that a processor unit B is to be partnered with unit A and has just produced an Interrupt Request signal, per action box 104. For this operation, processor unit X does not issue an On-Line Command as discussed above with reference to decision box 122, and instead commands the on-line processor unit A in effect to bring its partner unit B on line. In response to that command, unit A produces a partner request signal, and sends it to unit B, by way of the C-bus section 42a. This signal causes the off-line processor unit B to produce an affirmative result from decision box 124, and to set its status flag to duplex, as indicated with action box 128. Processor unit B then proceeds to become on-line by way of action box 116.

Each foregoing sequence by which an off-line processor unit attains the on-line condition includes a resetting of the distribution counter 76, FIG. 3, in each processor unit which is on-line as well as in the unit which is executing the synchronize routine 106 to attain on-line condition. Thus, prior to executing the on-line action of box 116, each processor unit is operating in lock-step synchronism with all other on-line processor units. When the off-line processor attains on line-condition, by way of arbitration through action box 110 and decision box 112, this sequence includes producing a synch signal which, as indicated in FIG. 3, restarts the timing divider 78 and initializes and commences the stepping of the distribution counter 76.

When the processor unit attains on-line condition by receiving an On-Line Command, i.e. by way of decision box 122 and action box 126, the on-line processor which produces the On-Line Command also, preferably prior to issuing that command, issues the synch signal which reinitializes and places in lock-step synchronization all processor units which are on-line as well as the unit which is being transferred to the on-line condition.

In the third instance, where the off-line processor unit is brought on-line by way of a partner unit, i.e. by way of decision box 124 and action box 128, either the on-line processor unit which is handling interrupts and which activates the active partner unit to issue a partner Request signal, or the latter, active unit, first produces a synch signal to synchronize all processor units in the computer system processor section, including the unit being brought on line.

Figure 5:
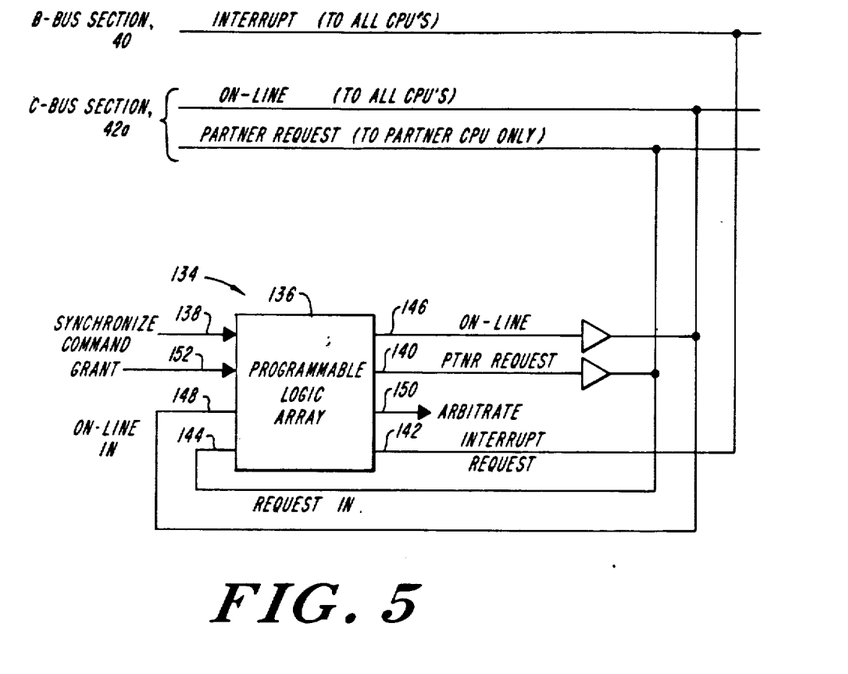
FIG. 5 is a block schematic representation of a circuit for performing the distributed synchronize operation of FIG. 4.

FIG. 5 illustrates one implementation of a synchronize circuit 134 for providing the foregoing operation of FIG. 4. The circuit employs a programmable logic array 136 that receives, any of three synchronize commands on conductors 138. One such command is a Synchronize Ready signal produced in action box 104 and in response to which the program logic array produces an Interrupt Request signal on conductor 142, as also designated in FIG. 4 with action box 104. The other two synchronize commands are a Go On-Line Simplex Command and a Go On-Line Duplex Command. The Interrupt Request signal is illustrated as applied to a conductor of the B bus 40 for communication to all other on-line processor units. Thus, each on-line processor unit receives an interrupt request on its conductor 98, shown at the bottom of FIG. 3, which is an input conductor to an interrupt gate 94 in the unit.

A processor unit which is on-line, produces a partner Request signal on a conductor 140, in response to a command to bring a partner unit on-line. The partner Request signal is applied, through a driver that is part of the array 136, to a conductor of the C bus 42 that applies the signal only to the off-line partner processor unit. The latter unit, receives the partner Request signal on conductor 144 and responds by proceeding as described above in accordance with an affirmative result from decision box 124 (FIG. 4).

The signal which a processor unit produces when assuming on-line condition is asserted on conductor 146 in FIG. 5 and is applied to a conductor of the C bus 42 for communication to all other processor units of the computer system. As shown, each unit receives this signal as an On-Line Input on a conductor 148.

When a processor unit is to arbitrate for bus access, it activates an Arbitrate signal on conductor 150. A successful result of the arbitration is a Grant signal asserted on a Grant Input conductor 152 to the programmable logic array 136. These action correspond to action box 110 and decision box 112 of FIG. 4.

It will thus be seen that the objects set forth above, among those made apparent from the preceding description, are efficiently attained. It will be understood that changes may be made in the above constructions and in the foregoing sequences of operation, within the scope of known skills and practices, without departing from the scope of the invention. It is accordingly intended that all matter contained in the above description or shown in the accompanying drawings be interpreted as illustrative, rather than in a limiting sense.

It is also to be understood that the following claims are intended to cover all of the generic and specific features of the invention as described herein, and all statements of the scope of the invention which as a matter of language might be said to fall therebetween.

Having described the invention, what is claimed as new and secured by Letters Patent is set forth in the appended claims:

1. Digital data processor apparatus having a processor section, a memory section, an input-output section, and a bus section for a transfer of signals between the processor section and each of the memory section and the input-output section, said apparatus having an improvement for providing an expandable processor section and comprising     A. a set of at least first and second processor units constituting said processor section, said set of processor units performing processor-section tasks selected from the tasks of responding to interrupt signals received by way of said bus section, arbitration for access to the bus section, and synchronization of said processor units, B. each processor unit being connected with said bus section and including means for performing information processing operations with said memory section and with said input-output section autonomously of other processor units, C. each processor unit further including task distribution means (i) for operation in selected synchronism with the task distribution means of each other processor unit in said processor section, and (ii) for conditioning that processor unit for performing processor-section tasks at times different from the conditioning of other processor units for processor-section task performance and for time intervals inversely proportional to the number of said processor units in said processor section.

2. Digital data processor apparatus according to claim 1 having the further improvement wherein each task distribution means includes distribution counter means initialized in synchronism with the distribution counter means in other processor units of said processor section in response to a selected synchronization signal received on said bus section and to a count different from an initialized count of said other distribution counter means, said distribution counter means stepping the count thereof in synchronism with other distribution counter means in said processor section in response to a selected further timing signal received on said bus section.

3. Digital data processor apparatus according to claim 1 having a further improvement in which said task distribution means includes means for interrogating said processor section, by way of said bus section, to determine the number of processor units connected thereto and for adjusting a count sequence of said distribution counter means thereof in response to said determined number of processor units.

4. Digital data processor apparatus according to claim 1 having the further improvement wherein A. each said processor unit operates alternatively in an off-line condition in which it initiates no transfers of processing signals to other units by way of said bus section and in an on-line condition in which it transfers processing signals to other units by way of said bus section, and B. each said task distribution means includes initialization means (i) for maintaining that processor unit in said off-line condition in the absence of a synchronization initialization signal received on said bus section, and (ii) for producing a synchronization initialization signal and applying it to said bus section, thereby for assuming said on-line condition and, when in said off-line condition, in response to arbitration for access to said bus section for signal transmission.

5. In a data processor unit for connection in a computer system having at least a processor section which includes one or more of such processor units, a memory section, an input-output section, a clock section for providing system timing signals, and a bus section for communicating information including data and commands between said processor section and said memory section and said input-output section, and for communicating system timing signals to said sections, and in which said processor unit has means for arbitrating for access to said bus section for transmitting of information by said processor unit to at least one of said memory section and said input-output section, the improvement for providing said arbitration for bus access in the presence of a set of one or more other like processor units in the processor section, said improvement comprising A. distribution counter means connected with said arbitration means for providing, in response to the count thereof, an arbitration priority value for that processor unit and to which said arbitration means responds, B. said distribution counter having means for responding to system timing signals for stepping the count thereof, C. initialization means for applying to said distribution counter means a selected initializing count condition different from that applied to other processor units in said set thereof, D. so that said distribution counter means of one said processor unit is initialized in synchronism with the distribution counter means of other processor units in said set thereof, and steps the count thereof in synchronism with all others, E. whereby each of selected processor units has a higher arbitration priority value then all other selected units one at a time, for distributing arbitration priority selectively among said selected processor units.

6. In a data processor unit according to claim 5 in which said processor unit has multi-contact connector means for removable and replaceable connection to said computer system, the further improvement wherein said initialization means includes digital logic means connected with selected contacts of said connector means for providing said selected initialization count condition in response to a signal set received at said selected contacts.

7. In a data processor unit according to claim 5, the further improvement wherein said distribution counter means further includes means for receiving from said bus section size information identifying the number of processor units in said set thereof, and B. means for changing, the stepping sequence thereof in response to said size information so that the count of said counter means cycles in a number of count steps depending on said size information.

8. In a data processor unit for connection to a computer system having at least a processor section which includes one or more of such processor units, a memory section, an input-output section, a clock section for providing system timing signals, and a bus section for communicating information including data and commands between said processor section and said memory section and said input-output section, and for communicating system timing signals to said sections, and in which said processor unit has means for responding to an interrupt signal received on said bus section from at least one of said memory section and said input-output section and another processor unit in said processor section and provides said interrupt response only when enabled, the improvement for providing response to interrupts in the presence of a set of one or more like processor units in the processor section, said improvement comprising A. distribution counter means connected with said interrupt responsive means for providing an interrupt enable signal only in response to a first selected count condition, B. said distribution counter means having means for responding to system timing signals for stepping the count thereof, C. means for applying to said distribution counter means a selected initialization count condition different from that applied to other processor units in said set thereof, D so that said distribution counter means of said processor unit is initialized in synchronism with distribution counter means of other like processor units in said set thereof and steps the count thereof in synchronism with all others, E. whereby each of selected processor units has said first selected count condition one at a time, for distributing the response to interrupt signals selectively among said selected processor units.

9. In a data processor unit according to claim 8 in which said processor unit has multi-contact connector means for removable and replaceable connection to said computer system, the further improvement wherein said initialization means includes digital logic means connected with selected contacts of said connector means for providing said selected initialization count condition in response to a signal set received at said selected contacts.

10. In a data processor unit according to claim 8 the further improvement wherein said distribution counter means further includes A. means for receiving from said bus section size information identifying the number of processor units in said set thereof, and B. means for changing a stepping sequence thereof in response to said size information so that the count of said counter means cycles in a number of count steps depending on said size information.

11. In a data processor unit according to claim 8, the further improvement

A. comprising means responsive to a status of a processor unit for producing a processor idle signal under selected conditions, and B in which said interrupt responsive means includes logic means connected with said distribution counter means for providing said interrupt enable signal in response to any one of said first selected count condition and said processor idle signal.

12. Data processing apparatus having at least a processing section having at least first and second data processor units, a memory section, an input-output section, a clock section for providing system timing signals to said processing section, and a memory section and input-output section, and a bus section for communicating information including data and commands between said processing section and said memory section and said input-output section and for communicating system timing signals to said sections, the improvement comprising A. means in each processor unit for performing information processing operations and means in each processor unit for performing processor-section tasks.

B. distribution counter means in each of said first and second processor units for providing a distribution count for that processing unit, C. each distribution counter means having means for responding to system timing signals for stepping the count thereof, D. initialization means in each of said first and second processor units for applying to said distribution counter means thereof an initializing count condition different from that applied to other processor units, so that each processor unit has a different distribution count from the other, at any operating time, and E. enabling means in each of said first and second processor units for enabling that unit to perform processor section tasks only in response to a selected distribution count.

13. Data processing apparatus having at least a processing section having at least first and second data processor units, a memory section, an input-output section, a clock section for providing system timing signals to said processing section, and a memory section and to said input-output section, and a bus section for communicating information including data and commands between said processing section and said memory section and said input-output section and for communicating system timing signals to said sections, the improvement comprising A. means in each processor unit for performing information processing operations, and means in each processor unit for performing processor-section tasks.

B. distribution counter means in each of said first and second processor units for providing a distribution count for that processing unit, each processor unit having a distribution count different from the other, at any operating time, and responding to system timing signals for stepping the count thereof in synchronism with the other, and C. distribution decoding means in each of said first and second processor units, each of which is responsive to a selected distribution count for enabling that processor unit to perform processor-section tasks at a time different from that of the other processor unit.

14. Digital data processor apparatus having a processor section, a memory section, an input-output section and a bus section for the transfer of signals between the processor section and each of the memory section and the input-output section, said apparatus having the improvement for providing an expandable processor section and wherein A. said processor section includes a set of at least first and second processor units and performs processor-section tasks selected from the tasks of responding to interrupt signals received by way of said bus section, arbitration for access to the bus section, and synchronization of said processor units, and B. each said processor unit has means for performing selected processor-section tasks autonomously of other processor units and for a time inversely proportional to the number of said processor units in said processor section, and further having means for autonomously commencing information processing operation with selected synchronism relative to other of said processor units.

15. An information processing method for digital data processor apparatus having a processor section, a memory section, an input-output section, and a bus section for the transfer of signals between the processor section and each of the memory section and the input-output section, said method providing for the selective expansion-/and contraction of said processor section and comprising the steps of A. providing in said processor section at least first and second sets of processor units, each set having at least one processor unit, B. performing with each processor unit information processing tasks and processor-section tasks selected from the tasks of responding to interrupt signals received by way of said bus section, arbitration for access to the bus section, and synchronization of said processor units, and C. performing at least selected processor-section tasks with any one set of processor units substantially autonomously of other sets of processor units, said performing of processor-section tasks by any one set of processor units being to the exclusion of performing such tasks by other sets of processor units and for a time inversely proportional to the number of said sets of processor units in said processor section.

16. An information processing method according to claim 15 having the further step of commencing information processing operation by said sets of processor units with selected synchronism relative to one another.

17. An information processing method according to claim 15 having the further step of scheduling the performance of processor-section tasks by each set of processor units with clock means therein operating synchronously with the corresponding clock means in other of said processor units and selectively offset from said other clock means.

* * * * *

UNITED STATES PATENT AND TRADEMARK OFFICE
CERTIFICATE OF CORRECTION

PATENT NO. : 4,816,990
DATED : March 28, 1989
INVENTOR(S) : Jeffrey L. Williams

It is certified that error appears in the above-identified patent and that said Letters Patent is hereby corrected as shown below:

Column 2, line 16 delete "it" and insert --unit--.

Column 3, line 41 delete "he" and insert --the--.

Column 15, line 3 delete "partner" and insert --Partner--.

Column 15, line 62 delete "partner" and insert --Partner--.

Column 16, line 16 delete "partner" and insert --Partner--.

Column 16, line 18 delete "partner" and insert --Partner--.

Column 16, line 22 delete "partner" and insert --Partner--.

Column 18, line 45 before "means" insert --A.--.

Column 20, line 22 delete "section, and a" and insert --section and to said--.

Signed and Sealed this

Thirtieth Day of July, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,816,990
DATED : March 28, 1989
INVENTOR(S) : Jeffrey L. Williams It is certified that error appears in the above-identified patent and that said Letters Patent is hereby corrected as shown below:

Column 18, line 44, before "means" please insert --A.--.

Column 19, line 14, "D" should be --D.--.

Column 19, line 48, "B" should be --B.--.

Column 19, line 68, "tasks." should be -tasks,--.

Column 20, line 32, "tasks." should be -tasks,--.

Signed and Sealed this

Eighth Day of September, 1992

Attest:

DOUGLAS B. COMER

*Attesting Officer*   Acting Commissioner of Patents and Trademarks